United States Patent [19]

Bastian et al.

[11] Patent Number: 4,466,059
[45] Date of Patent: Aug. 14, 1984

[54] METHOD AND APPARATUS FOR LIMITING DATA OCCUPANCY IN A CACHE

[75] Inventors: Arlon L. Bastian, Pima County; Marc E. Goldfeder, Tucson; Michael H. Hartung, Pima County, all of Ariz.

[73] Assignee: International Business Machines Corporation, Armonk, N.Y.

[21] Appl. No.: 311,738

[22] Filed: Oct. 15, 1981

[51] Int. Cl.³ .................. G06F 3/06; G06F 13/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,566,358 | 2/1971 | Hasbrouck | 364/200 |
| 3,588,829 | 6/1971 | Boland | 364/200 |
| 4,075,686 | 2/1978 | Calle et al. | 364/200 |
| 4,084,231 | 4/1978 | Capozzi et al. | 364/200 |
| 4,084,234 | 4/1978 | Calle et al. | 364/200 |
| 4,084,236 | 4/1978 | Chelberg et al. | 364/200 |
| 4,115,850 | 9/1978 | Houston et al. | 364/200 |
| 4,149,239 | 4/1979 | Jenkins et al. | 364/200 |
| 4,161,024 | 7/1979 | Joyce et al. | 364/200 |
| 4,217,640 | 8/1980 | Porter et al. | 364/200 |

*Primary Examiner*—Jerry Smith
*Assistant Examiner*—Mark P. Watson
*Attorney, Agent, or Firm*—H. F. Somermeyer

[57] ABSTRACT

A storage hierarchy has a backing store and a caching buffer store. During a series of accesses to the hierarchy by a user, writing data to the hierarchy results in data being selectively removed from the buffer store. Space in said buffer store not being allocated to data being written results in such data being written to the backing store to the exclusion of the buffer store. Removal of data increases the probability of writing data to the backing store. In a preferred implementation, the backing store is one or more disk type data storage apparatus and the buffer store is an electronic random access memory.

35 Claims, 3 Drawing Figures

FIG_2

METHOD AND APPARATUS FOR LIMITING DATA OCCUPANCY IN A CACHE

FIELD OF THE INVENTION

The present invention relates to multilevel storage hierarchies, more particularly to the control thereof with respect to data residence in upper levels of the hierarchies.

BACKGROUND OF THE INVENTION

Peripheral storage hierarchies have been used for years for providing an apparent store as suggested by Eden, et al in U.S. Pat. No. 3,569,938. Eden, et al teach that, in a demand paging or request system, caching data in a cache-type high-speed front store (buffer) can make a peripheral storage system appear to have a large capacity yet provide rapid access to data, rapid access being faster than that provided to the normal backing store. Eden, et al also teach that the backing store can be a retentive store, such as magnetic tape recorders and magnetic disk recorders, while the front store can be a volatile store such as a magnetic core store. With the advances in data storage technology, the front store typically includes semiconductive-type data storage elements. U.S. Pat. No. 3,839,704 shows another form of the storage hierarchy.

An important aspect of storage hierarchies is enabling data integrity. That is, the data received from a user, such as a central processing unit (CPU) or other data handling device, should be returned to the supplying unit either correct or with an indication that errors may exist. Also, it is typical practice in storage hierarchies to move data from a higher level to a lower level for such retentive storage, as well as to limit the data in the higher levels such that other data can be stored for rapid access. U.S. Pat. No. 4,020,466 shows copying changes from a high-level store to a backing store, while U.S. Pat. No. 4,077,059 shows forcing copy-back under predetermined conditions. Such copy-back operations can consume storage hierarchy performance time, i.e., so much data may be copied back that access to the data by a using unit may be degraded. This problem is partially solved by U.S. Pat. No. 3,588,839, which teaches that the only data that need be copied back from a high-level storage unit to a low-level storage unit is that data that is altered, i.e., where there is noncongruence between data in a backing store and data in a front store.

Storage hierarchies have taken diverse forms. For example, in accordance with the Eden, et al U.S. Pat. No. 3,569,938, a single high-speed store serviced several users. U.S. Pat. No. 3,735,360 shows that each processor can have its own high-speed store, or cache, for different performance reasons. Performance of the storage hierarchies also is affected by the algorithms and other controls used to place predetermined data into the cache, or high-speed storage portion. Accordingly, U.S. Pat. No. 3,898,624 shows that varying the time of fetching data from a backing store to a front, or caching, store can be selected by the computer operator in accordance with the programs being executed in a using CPU. In this manner, it is hoped that the data resident in the cache or upper level of the hierarchy will be that data needed by the CPU, while excess data not needed is not resident; this arrangement allows more useful data to be stored in the higher level storage portion. All of these operations become quite intricate. Accordingly, evaluation programs for storage hierarchies have been used to evaluate how best to manage a storage hierarchy. U.S. Pat. Nos. 3,964,028 and 4,068,304 show performance monitoring of storage hierarchies for achieving these goals. Even at that, much remains to be done in various types of storage hierarchies for enhancing optimum performance while ensuring data integrity. Much of the work with respect to storage hierarchies has occurred in the cache and main memory combinations connected to a using CPU. The principles and teachings from a cached main memory relate direction to caching and buffering peripheral system, as originally suggested by Eden et al, supra. Of course, main memory has been used prior to Eden et al for buffering or caching data from a magnetic tape and disk unit for a CPU, i.e., a main memory was not only used as a CPU working store but also as a buffer for peripheral devices.

The performance monitoring referred to above has indicated that it is not always in the best interest of total data processing performance and integrity to use a caching buffer interposed between a using unit and a backing store. For example, U.S. Pat. No. 4,075,686 teaches that a cache can be turned on and off by special instructions for bypassing the cache. Further, the backing store or memory was segmented into various devices with some of the devices, or segments, being bypassed, such as for serial or sequential input-output operations. This patent further teaches that, for certain commands, it is more desirable to not use cache than to use cache. U.S. Pat. No. 4,268,907 teaches that, for a command specifying the fetching of data words, an indicator flag is set to a predetermined state. Such indicator flag causes data transfer circuits to respond to subsequent predetermined commands to bypass cache storage. This bypass prevents replacement (flushing) of data instructions stored in cache during the execution of long serial data transfers. Further, U.S. Pat. No. 4,189,770 shows bypassing cache for operands, but using cache for storing instructions.

In some storage hierarchies, data integrity is ensured by transferring data to both the cache and a backing store whenever data is written to the memory. As an example see U.S. Pat. No. 4,045,781. While in many instances this may prove valuable, it does tend to have high data occupancy in the cache which may have adverse effects on total performance in certain applications. U.S. Pat. No. 4,173,781 describes a table control system for ensuring coherence between various levels in a storage hierarchy. Several storage hierarchies have involved updating a backing store after updating a cache, such as in U.S. Pat. No. 4,167,782, or controlling the updating of the cache when the memory is updated, such as shown in U.S. Pat. No. 4,157,586. Other systems always write to cache once data is resident in cache, or have space allocated in cache as taught by U.S. Pat. No. 4,084,234. For data integrity, changes to data in a cache are usually copied back to a lower level, or backing store, such as shown in U.S. Pat. No. 4,020,466. In a multilevel storage hierarchy including a direct access storage device (DASD), also termed a disk data storage device, having an electronic random-access memory cache, it is desired to always have data written to the DASD, which is a retentive memory, as soon as possible. Such writing ensures data integrity by storing data in a retentive memory as opposed to storing data only in a volatile electronic random-access memory.

SUMMARY OF THE INVENTION

It is an object of the present invention to enhance operation of a data storage hierarchy, including a DASD and a volatile caching buffer, by writing to the DASD whenever space is not allocated for data in the caching buffer, and to limit data stored in the caching buffer for encouraging writing to the DASD. Reading data is encouraged to be from the caching buffer.

In accordance with the present invention, a storage hierarchy is operated by monitoring a series of requests for access to the storage hierarchy received from a user and indicating when certain types of requests are received. In response to the indicated requests, predetermined data is removed from the buffer store such that subsequent predetermined storage access requests will relate to data stored only in the backing store. In a preferred form of the invention, the predetermined operations are: writing data to the storage hierarchy, particularly those writing operations that may relate solely to the backing store to the exclusion of the caching buffer store; or writing data when sequential data is occurring; or updating data in the caching buffer plus writing data to the backing store; or updating data in the caching buffer while sequential data is being processed; or updating plural records in a given addressable area. The data to be removed is selected in accordance with the criteria used to institute the data removal. In a peripheral system, the removal of data preferably occurs upon completion of the series of requests, which are often referred to as a chained set of commands.

A corollary aspect of the invention is to promote data to the caching buffer in response to requests for data to be read from the storage hierarchy. Accordingly, in a certain aspect of the invention, writing data to the storage hierarchy includes a preference to writing directly to the backing store to the exclusion of the caching buffer store, while reading data from the storage hierarchy gives a preference to reading data stored in the caching buffer store.

The invention also contemplates apparatus consonant with the methods set forth above.

The foregoing and other objects, features, and advantages of the invention will be apparent from the following more particular description of the preferred embodiments of the invention, as illustrated in the accompanying drawings.

DETAILED DESCRIPTION

Figure 1:
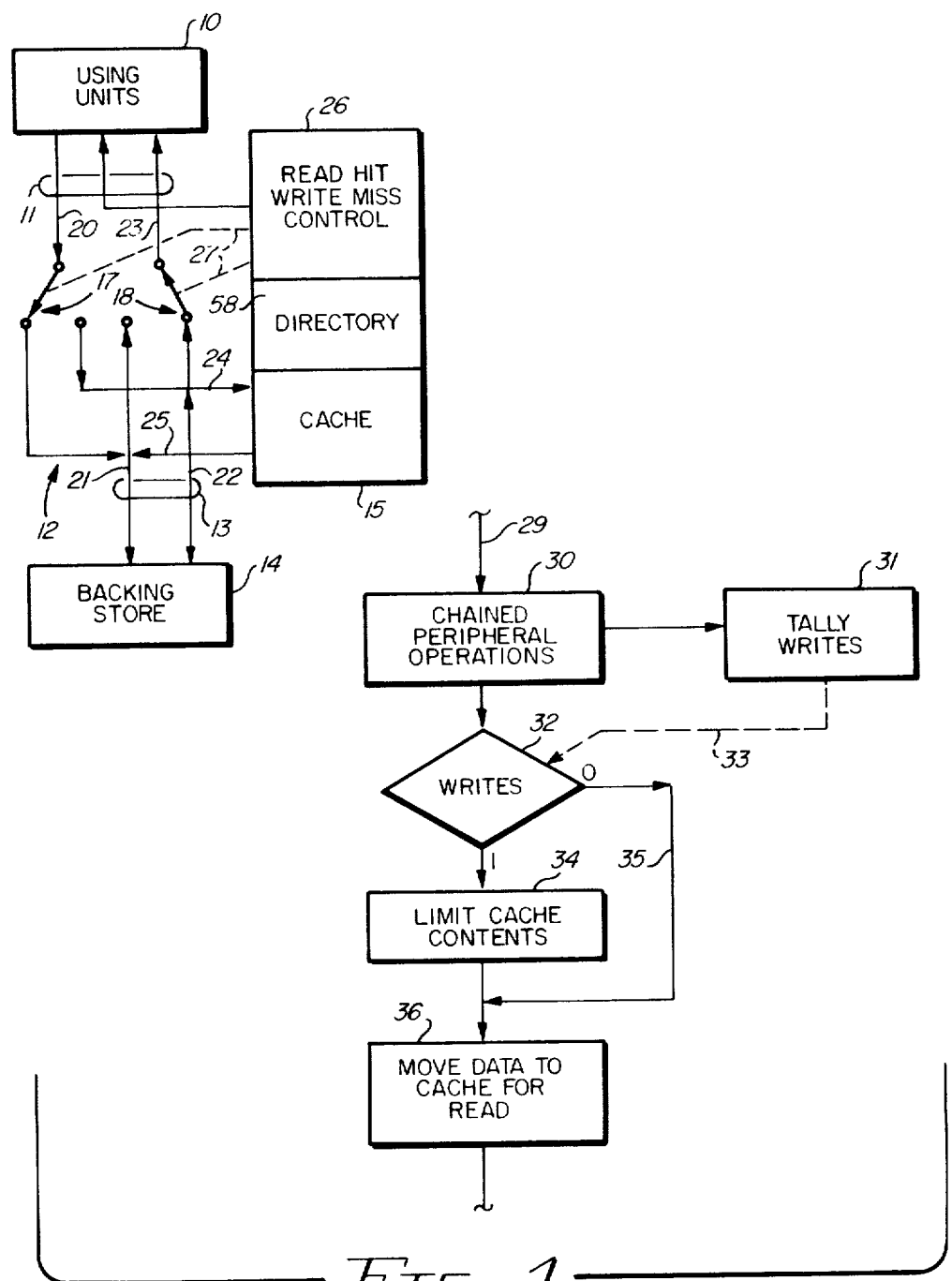
FIG. 1 includes a block diagram and a machine operations chart of a storage hierarchy employing the present invention.

Referring now more particularly to the drawing, like numerals indicate like parts and structural features in the various diagrams. Using units 10, such as central processing units and the like, are coupled via input/output connections 11 to a storage hierarchy having a storage director 12, and preferably in the form of a peripheral data storage system. The storage hierarchy includes a backing store 14 and a cache, or caching buffer store, 15. Data is transferred between the backing store 14 and cache 15 via a set of device connections 13. Selectively, using units 10 can access cache 15 or backing store 14 in accordance with switch 17, 18 settings. For example, switch 17 set as shown couples output bus 20 of input/output connections 11 to device input connections 21 for transferring data from using units 10 directly to backing store 14. Backing store 14 supplies data directly to using units 10 via device output bus 22 of device connection 13; thence, through switch 18 and input bus 23 of input/output connections 11 to using units 10. Actuating switches 17, 18 to the alternate position connects output bus 20 to cache input bus 24, while cache output bus 25 is connected by switch 18 to using units input bus 23. Buses 24, 25 also provide for data transfer between cache 15 and backing store 14. In a preferred construction of the invention, backing store 14 includes a plurality of direct access storage devices (DASD), while cache 15 is an electronic random-access memory, preferably of the semiconductive type.

In accordance with the invention, the illustrated storage hierarchy is operated by read-hit write-miss control 26 to encourage writing directly to backing store 14 and reading data from cache 15. The operation is such that, when cache directory 58 is examined upon any storage access request received from using units 10 on a write type of operation, with no space allocated in cache 15, data is written directly to backing store 14. When DASDs are used, it is desired to write directly to the retentive DASDs as opposed to writing to the volatile cache 15. Such operation saves rewriting data from cache 15 to backing store 14. Data integrity requires storing data in a retentive store as early as possible. When data is to be supplied to using unit 10 during a read operation, it is desired to have as short an access time as possible. For reads, data integrity is ensured by retaining a copy of the data in backing store 14. Accordingly, for read operations read-hit and write-miss control 26 moves data from backing store 14 to cache 15 for ensuring that read data requests are satisfied from data stored in cache 15.

In accordance with one aspect of the invention, analyzing writing data operations and then removing data from cache 15 in accordance with such analyzation tends to encourage write misses of cache 15, hence encourages writing directly to backing store 14. This operation is important when backing store 14 consists of a plurality of disk-type data storage apparatus (DASD). Accordingly, in a series of operations such as represented as beginning at reference numeral 29 and continuing at step 30 as chained peripheral operations, all write operations of a given type are tallied at step 31. Upon completion of the chained peripheral operations, the storage hierarchy at branch 32 examines the tallied writes. If there are no writes that are of a given type, as later described, then no action is taken to limit data in cache 15. After certain write operations wherein the write operations is tallied at step 31, storage director 12 at step 34 limits the cache contents by removing addressability of predetermined data stored in cache 15. Such predetermined data is usually related to the writes tallied at step 31. To encourage read hits in cache 15, data is moved to the cache from backing store 14 at step 36.

The presently-described cache management control tends to reduce the probability of a cache write hit, usually without reducing the probability of a cache read hit. Data promotion moves to the cache that data which is likely to be referenced again soon by read accesses and where those later references are not expected to consist solely of writes. In this way, the later references can be resolved in the cache rather than by the backing store. Modeling has shown that eliminating the normal asynchronous data promotions which result from write-through to backing store processing usually does not dramatically affect the read hit ratio (and may improve it), but does reduce the write hit ratio. The elimination of updating cache when writing to the backing store also reduces the internal peripheral data storage system workload, since the impact on system performance by such data movements from the backing store 14 to cache 15 is lessened for a given workload of user accesses to the storage hierarchy. The storage hierarchy performance on writes is not diminished by increasing the probability that a given write command will be processed as a write miss rather than as a write hit. Because channel busy contributes to DASD access rotational misses for a write miss, a write miss does have a higher probability of a rotational miss than would a write hit. This fact is offset by the fact that the elimination of the dual transfer associated with write hits (first a transfer to cache followed by a transfer from cache 15 to DASD 14) reduces the control unit's contribution to a rotational miss. The net result is usually an overall reduction in rotational misses as the number of cache write hits goes down and the number of cache write misses goes up. This means an increase in performance.

The present invention also enhances data integrity over writing to cache 15, a volatile store. Writing directly to the retentive backing store results in data modifications controlled directly by the using unit. Any writing or recording errors are immediately detected. When writing to cache 15, then writing later to backing store 14, a recording error occurs such that the using unit is unaware that damage may have been done. If the using unit were made aware of the damage in some fashion, there presently exists to easy automated way for recovery from such asynchronous errors. Therefore, for data integrity, final recording status should not be given until the retentive backing store 14 has successfully recorded the data. If a pure write-through to backing store 14 were used, cache buffer 15 and backing store 14 would have divergent data, which is also avoided by controls of the present invention.

Figure 2:
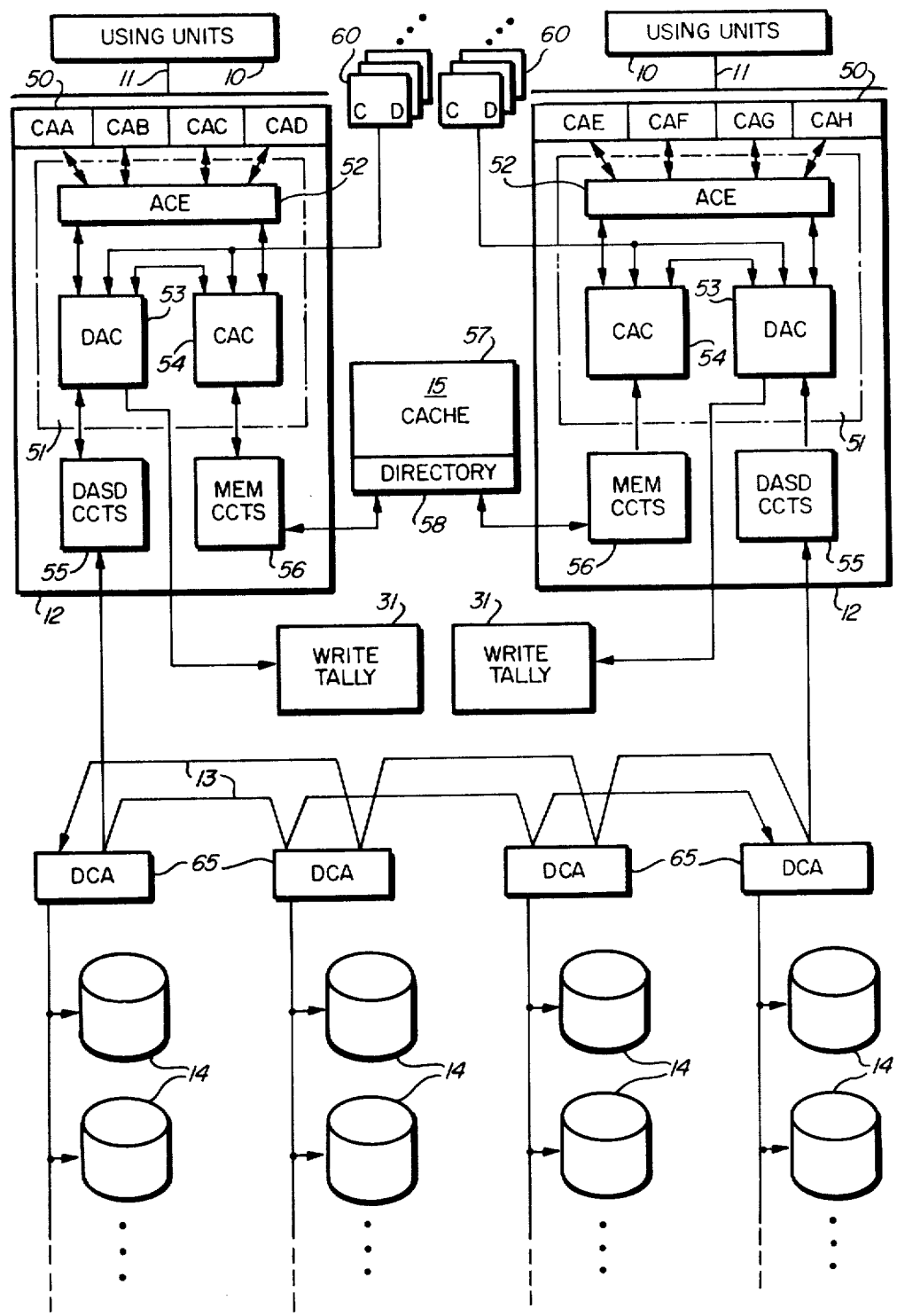
FIG. 2 is a block diagram of a peripheral storage system type of storage hierarchy employing the present invention as set forth in FIG. 1.

FIG. 2 illustrates a preferred embodiment of the invention as employed in a two storage director 12 arrangement. Each storage director 12 includes a plurality of so-called channel adaptors 50, also separately denominated as CAA through CAH, which connect the respective storage directors 12 to a plurality of using units 10 via a plurality of input/output connections 11. Each storage director 12 includes a programmed processor 51 which, as usual, includes a processing unit (not shown) having a control store (not shown) which contains computer programs for performing the storage director functions. The programmed processor includes programs constituting address and command evaluator ACE 52 which receives and evaluates peripheral commands. Such functions are also performed in present day storage directors for noncached DASDs as widely sold throughout the world. The programmed processor 51 also includes direct access control DAC 53, which responds to commands evaluated and decoded by ACE 52 to control data transfers between using units 10 and the DASD 14 devices addressed, as well as to provide device commands to DASD 14 for performing well known DASD access and control functions. DAC 53 also creates write tally operations at step 31 which is located in its control store (not shown). Programmed processor 51 further includes CAC 54, which is a cache access control for accessing cache 5. CD bits 60, one bit for each of the DASDs 14, are accessed by DAC 53 and CAC 54 respectively for determining whether to access cache or DASD and for setting the bits to D at a cache miss. Connections from storage director 12 to DASD 14 are via DASD circuits 55, which are constructed using known device adaptor and data flow design techniques. Cache 15 is accessed via memory circuits 56, which include those circuits for generating addresses and access requests. Cache 15 is a portion of a large random-access store 57, hereinafter referred to as a system store. A directory 58 for cache 15 is stored in store 57. The directory 58 is accessed using known hashing techniques based upon the address structure of DASDs 14. Each unit of data, track or record stored in cache 15 has an entry in directory 58, as is known in the data processing art.

Access to DASDs 14 is via a so-called string arrangement in which a plurality of DASDs 14 are connected to the storage directors 12 via controllers 65, separately denominated as DCA. Each storage director 12 connects to the controllers 65 via the daisy-chain device connection 13. A radial connection of known design may also be employed. The operation of the FIG. 2 illustrated system in accordance with the invention is best understood by referring to FIG. 3, a machine operations chart.

Figure 3:
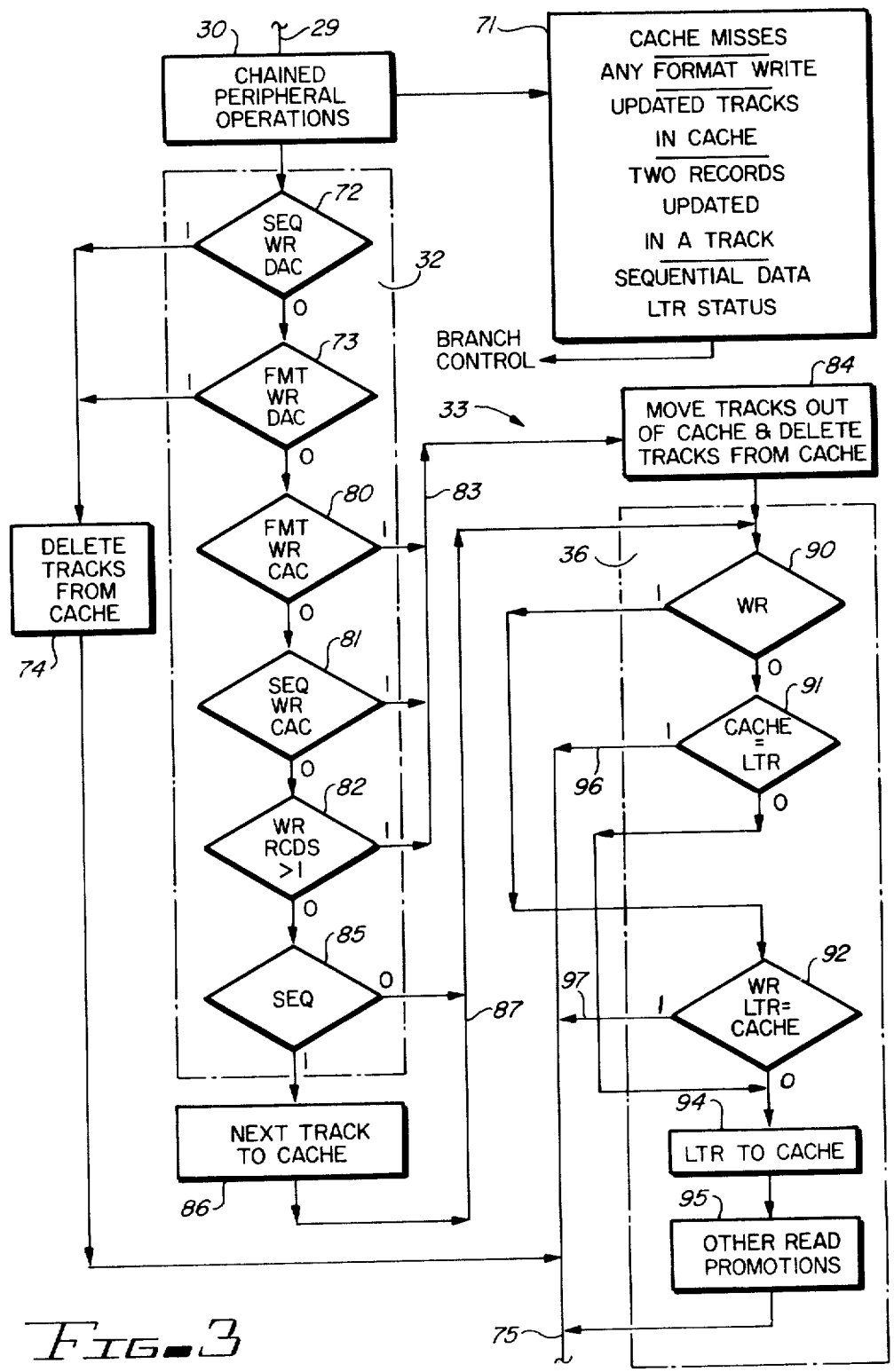
FIG. 3 is a machine operations chart detailing the operation of the FIG. 2 illustrated embodiment.

Referring next to FIG. 3, the chained peripheral operations 30 are performed in accordance with present-day procedures for peripheral systems that attach to computers manufactured by International Business Machines Corporation, such as the so-called series 370 computers, 4300 series and the like. During such chained peripheral operations, each storage director 12 tallies in its control store 71, a selection of write operations that occur during the chained peripheral operation. Such writing operations that are tallied include a so-called format write. Format writes include known peripheral commands associated with the above-referred-to computers, such as write home address, write record zero, write count key and data, and so forth. Updating data by writing the key and the data is written to cache or to DASD 14 in accordance with the CD bits.

A second type of write operation relates to writing in cache 15. That is, each occurrence of data updating in cache 15 during a command chain is stored such that, upon completion of the chained operations, the data which was updated in the cache during a command chain which included a format write may be demoted from cache 15 to DASD 14 and effectively erased from cache 15 by destroying addressabilities of the cache 15 data area. That is, the directory 58 entry relating to the data stored in the cache 15 is erased. Further, in any given chained operation, if sequential data is indicated by a using unit 10 supplying a so-called sequential bit (not shown), then all of the data that is updated during the chained operation is moved to DASD 14 and effectively erased from cache 15. Further, if any data area, which may include a plurality of data records, has more than one record updated, then such data residing in that cache data area is demoted to DASD 14 upon completion of the chained operation. Combinations of the above-described types of write operations as well as additional types of write operations can be used for limiting data in the cache for encouraging write misses, i.e., enabling writing directly to DASD 14 without accessing cache 15 for ensuring data integrity by writing directly to the retentive memory to the exclusion of a volatile memory. The term "data area" means either a storage area capable of storing a record track of data from DASD 14; a fixed number of data bytes, such as a 4-kilobyte virtual page; or some other addressable unit of storage as may be convenient.

Upon completion of the chained peripheral operation 30, the status bits stored at 71 are examined by storage director 12 as a branch control for executing branches 32. Branches 32 are usual branch instructions within programmed processor 51. A first branch instruction 72 examines whether sequential bit SEQ was received from a using unit 10 for chained peripheral operation 30 and a write (WR) command was received. If the commanded write is to the DASD 14 via DAC 53, then logic step 74 deletes the data contents of cache 15 corresponding to the DASD 14 altered data by erasing the directory 58 entries. That is, data was written directly to DASD 14 and cache 5 received no writing, therefore no demotion of data is required. In a similar manner, at branch 73, if a format write (FMT) was executed and cache 15 was not updated, i.e., all writing was to DASD 14, then logic step 74 is performed. If neither of the conditions in branch steps 72-73 is satisfied, then at branch 80, if a format write command was received and a write operation was made to cache 15 via CAC 54, logic path 83 is followed to step 84 for moving the altered data from cache 15 to DASD 14 and then deleting from cache the data just stored in DASD 14. In a similar manner, at 81 when a write to cache 15 occurs when sequential data is indicated, such updated tracks are removed from cache 15. Also, at branch 82 when the number of records updated in a track stored in cache is greater than one, those tracks are removed from cache 15. If none of the tallied write conditions examined in steps 72 through 82 are satisfied, then at 85 programmed processor 51 examines the sequential bit in control store 71 to determine if sequential data was being processed and none of the tallied write conditions are met. If that is the case, then at step 86, the data contents of the track to be next accessed are moved from DASD 14 to cache 15 such that the next expected request for data will have its requested data stored in cache. For nonsequential data at branch 85 or upon completion or promoting the next track to cache 15 at step 86, programmed processor 51 via logic path 87 goes to operation 36 for other read-type data promotions to cache 15 from DASD 14. That is, different data transfer characteristics may require different data to be maintained within cache 15.

In accordance with another aspect of the invention, data promotion from backing store 14 to cache 15 with respect to a given chain of commands is inhibited or reduced anytime a write operation requires access to backing store 14, i.e., cache 15 does not have storage space allocated for satisfying the write request. In other words, it is expected that references to data written to storage hierarchy will not be repeated in the immediate future; only when data is being read from the storage hierarchy is it expected to have a soon-to-be-repeated reference. When a write operation finds no data space in cache 15, such write operation is completed directly with backing store 14. Eliminating the data promotion from a write miss should not dramatically affect read hit ratios, but it does reduce write hit ratios. Further, reducing the data movement related to data promotion reduces the workload of the storage hierarchy and thereby enhances access to data stored in the storage hierarchy. Accordingly, in operation step 36, at branch 90 a branch operation is entered from logic path 87 examines tally 71 for a tallied write operation. If there was no tallied write operation in the immediately-preceding chain of commands, storage director 12 at branch 91 examines cache 15 with respect to the last track referenced (LTR); if at the completion of the chain of commands cache 15 has a complete replication of the last track referenced, an exit path 96 to logic path 75 is followed. Otherwise,, at step 94 the data contents of LTR in DASD 14 are promoted to cache 15. For a tallied write operation indicated at branch 90, a further examination for promoting data occurs at branch 92 to determine whether or not the data contents of LTR are stored in cache 15 and are an accurate replication of the contents of LTR in DASD 14 (i.e., was cache 15 or DASD 14 written to at LTR?). If both criteria are met, an exit path 97 to logic path 75 is followed; otherwise at 94 the contents of LTR in DASD 14 are promoted to cache 15. Following steps 94, other promotions of data from backing store 14 to cache 15 for purposes beyond the present description may be made at step 95. In an alternate embodiment, the exits 96 and 97 from steps 91, and 92 may instead be directed to step 95. Then logic path 75 is followed after other read promotions from step 95 are completed for completing the operation. Programmed processor 51 also follows logic path 75 to perform other operations, including subsequent chained peripheral operations which repeat the abovedescribed process, after the deletion of the tracks from the cache 15 from step 74.

Instead of waiting until a completion of the chained peripheral operations 30, the data in cache 15 can be invalidated during execution of chained operations. That is, the data to be moved out of cache by step 84 can be performed concurrently to the chained operations, particularly for those conditions recited with respect to steps 80, 81 and 82. In a similar manner step 74 can be performed concurrently to chained peripheral operations 30. Updating the DASD 14 data images and the cache 15 data images as described avoids unnecessarily invalidating data images in the cache 15 for preserving a high hit ratio for read operation; i.e., data not expected to be read by using units 10 is removed from cache 15 to allow more data expected to be read to reside in cache 15. Encouraging write misses reduces the workload of the storage hierarchy in that the double transfers associated with writing to cache 15 and then writing to DASD 14 from cache 15 are avoided. While a write miss tends to reduce performance, such a factor is minor since the number of reads in a storage hierarchy typically exceeds the number of writes. The advantage achieved by immediate data integrity is readily apparent.

Access to DASD 14 surface record areas is based upon the relationship of the reading transducer (not shown) to the particular rotational position of the disk surface. Access to such disk surface is sensitive to the relative position of the transducer to the record area being accessed when the access request is received from using unit 10. Waiting for coincidence of the record area to the transducer area for the request is called latency delay. Such latency delay delays storage access over and above access to cache 15. This latency delay is less significant than the double transfer referred to above. Once a writing operation is instituted within a cylinder (a set of storage tracks at the same radius of the storage record surfaces in a multiple record DASD), it can be followed by a series of write operations which are synchronized to DASD rotational periodicity, thereby minimizing the latency delay effect.

While the invention has been particularly shown and described with reference to preferred embodiments thereof, it will be understood by those skilled in the art that various changes in form and details may be made therein without departing from the spirit and scope of the invention.

What is claimed is:

1. The method of operation a data storage hierarchy coupled to user units and having a backing store and a caching buffer store with means to store data in said buffer store based upon addressable storage areas of said backing store, both of said stores having a plurality of addressable storage areas;

including the steps of:
monitoring chained requests for access to said storage hierarchy received from said units;
setting a status bit based upon monitoring a predetermined type of said chained requests for access which indicates whether or not writing operations for the storage of data are included in the monitored chained requests; and
storing such written data in said backing store when said status bit has been set; and
removing data stored in said buffer store related to said written data from said buffer store whenever said status bit indicates a one of said given writing operations.

2. The method set forth in claim 1 further including the steps of:
in first operations in a first one of said chained requests writing first data to said buffer store and said backing store;
in second operations in a second one of said chained requests writing second data only to said backing store; and
setting said status bit when monitoring a one of said first or second chained requests to indicate said first or second operation as said given writing operation.

3. The method set forth in claim 1 including determining a completion of said monitoring said chained requests and then performing said removing step.

4. The method set forth in claim 3 further including the steps of:
receiving a sequential bit from said units for indicating that data accessed subsequent to the receipt of said sequential bit in said chained requests is sequentially processed data;
writing data subsequent to receipt of said sequential bit as said given writing operation; and
setting said status bit each time a said subsequent writing data step occurs for indicating occurrence of said given writing operation during said monitored chained requests.

5. The method set forth in claim 3 further including the steps of:
receiving predetermined requests for writing data during said chained requests including indicating in said received predetermined requests desired access to said backing store and never accessing said buffer store while writing data to said backing store subsequent to receiving each said predetermined request;
then writing data to said backing store and not writing data to said buffer store as said given writing operation; and
setting said status bit each time a said subsequent writing data step occurs.

6. The method set forth in claim 5 further including the steps of:
during predetermined ones of said chained requests writing data to said buffer store for updating data stored therein; and
effectively removing said updated data from said buffer store as said predetermined data.

7. The method set forth in claim 3 further including the steps of:
receiving from said user an indication that sequential data is being processed;
writing data to said buffer store after receiving said sequential data indication; and
removing said updated data in said buffer store which was updated subsequent to receiving said sequential indication bit as said predetermined data.

8. The method set forth in claim 3 further including updating data in said buffer store a plurality of times in a given addressable area; and
effectively removing said updated data that was updated a plurality of times as said predetermined data.

9. The method set forth in any of claims 4, 5, 6, 7, or 8, inclusive, wherein said buffer store is an electronic random access memory and said backing store includes a plurality of addressable DASDs, further including the steps of:
addressing said storage hierarchy in accordance with the address of a given one of said DASDs; and
separately monitoring a series of requests for each of said addressable DASDs whereby the data in said cache is limited in accordance with the addressed DASD.

10. The method set forth in claims 4, 5, 6, 7, or 8, inclusive, further including the steps of:
receiving a plurality of read data access requests, moving data to said buffer store from said backing store in accordance with said read data requests whereby read requests tend to relate to data stored in said buffer store and write requests tend to relate to data stored only in said backing store.

11. The method set forth in claim 10 further including:
identifying a last storage area accessed in said chained requests; and
upon completion of said chained requests promoting data from said backing store last storage area to said buffer store only when predetermined write operations did not occur in said chained requests.

12. The method set within claim 11 further including comparing the contents of the last storage area accessed in a first one of said stores with the data contents of the corresponding storage area in a second one of said stores and moving data between said stores to create data congruence between said stores and if said predetermined write operation occurred, effectively erasing the data contents of a one of said last referenced or corresponding one of said storage areas.

13. The method of operating a data storage hierarchy having a backing store and a caching buffer store with means to store data in said buffer store based upon addressable storage areas of said backing store, both of said stores having a plurality of addressable storage areas;

including the steps of:

receiving data storage access requests from a user for reading and writing data from and to the storage hierarchy, respectively;

analyzing said writing data access requests, removing data from said buffer store in accordance with said write data analyzing; and analyzing said read data access requests, moving data to said buffer store from said backing store in accordance with said read data analyzing whereby read requests tend to relate to data stored in said buffer store and write requests tend to relate to data stored only in said backing store.

14. The method set forth in claim 13 including receiving a request from a user for accessing said backing store to the exclusion of said buffer store; and in response to said backing store exclusive access, deleting predetermined data from said buffer store that was altered in predetermined ones of said write access requests that were analyzed and inhibiting promotion of predetermined other data from said backing store to said buffer store.

15. The method of operating a data storage hierarchy having a backing store and a caching buffer store with means to store data in said buffer store based upon addressable storage areas of said backing store, both of said stores having a plurality of addressable storage areas;

including the steps of:

receiving data from a user to be written into said hierarchy at a given addressed area of said backing store;

examining said buffer store to determine whether or not an addressable area thereof has been allocated to said given addressed area of said backing store;

when said examining reveals an allocated addressable area, write said data in said buffer store to said allocated area;

when said examining reveals no allocated addressable area in said buffer relating to said given addressed area, write said data to said given addressed area;

monitoring each said write operation and setting a status bit indicating a predetermined one of said write operations, removing predetermined data stored in said buffer store to thereby increase writing data to said backing store;

receiving requests from said user for data stored in said storage hierarchy; and moving data to said buffer store from said backing store in accordance with said received requests such that such requests for data tend to be responded to by supplying data to said user from said buffer store.

16. The method set forth in claim 15 further including the steps of:

within a given series of operations writing data to said buffer store and within the same series performing said monitoring step to set said status bit for write operations occurring during predetermined conditions indicating that the likelihood of reading the data from said buffer store is remote.

17. The method set forth in claim 15 wherein said condition is indicated by receiving a said request related directly to said backing store.

18. The method set forth in claim 15 wherein said conditions relate to receiving an indication from said user that data being processed is sequential data.

19. A data storage hierarchy having an adapter adapted to be connected to using units, comprising:

a cache store;

a backing store connected to said cache store;

communication paths connected to said adapter, said backing store and said cache for transferring data signals between said adapter, backing store and cache;

switching means coupled to said communications paths for selectively switching the communication paths between said adapter, said backing store, and said cache;

read hit means coupled to said communication paths for being responsive to predetermined ones of said data transfers from said cache to said adapter for promoting data from said backing store to said cache store to make said promoted data more readily available to said adapter;

directory means coupled to said cache and backing store for indicating data stored in said cache store as it relates to addressable areas of said backing store;

means coupled to said communications paths for monitoring writing operations which transfer data signals from said adapter to either said cache or backing store; and means for erasing data within said backing store from said cache for limiting the contents of said cache store in response to said monitoring of said writing operations.

20. The apparatus set forth in claim 19 including means coupled to said adapter for indicating a series of related operations; and means operative during said series of related operations to tally write operations for indicating how to limit cache contents upon the conclusion of said series of related operations.

21. The apparatus set forth in claim 20 further including a plurality of access indicating means for indicating whether a backing store or cache is to be accessed on a given request and means responsive to a directory means indicating no contents in said cache store to set said indicator to access said backing store.

22. The apparatus as set forth in claim 21 wherein:

said cache store is an electronic random access memory means;

said backing store includes a plurality of addressable direct access storage devices;

one of said access indicating means being assigned to each of said direct access storage devices for independently controlling access to said devices or to said cache for any of said devices.

23. The apparatus as set forth in claim 22 further including a programmed processor means coupled to said access indicating means for sensing same and for setting same and including program means for monitoring said operations for setting a plurality of conditions for limiting said cache contents including indications of received sequential data, receiving commands related directly to said direct access storage devices and receiving a plurality of writes for a given storage area in said cache store.

24. The machine-implemented method of operating a peripheral data storage hierarchy coupled to a host processor for transferring data therewith in accordance with access requests received from said host processor and having a backing store and a buffer store with means to store data in said buffer store based upon addressable storage areas of said backing store, both of said stores have a plurality of addressable data storage areas;

including the automatic steps of:
monitoring a series of requests for access to said storage hierarchy received from said host processor and setting a status bit for indicating whether or not sequential data is being transferred;
analyzing said series of requests for predetermined writing and reading access characteristics;
promoting all of the data stored in a one of said data storage areas of said backing store having a predetermined address relationship to said analyzed series of requests to said buffer store when said predetermined reading access characteristics occur simultaneously to said sequential data indication;
if said indication does not indicate said sequential data transfer, inhibiting promotion of data stored in said one data storage area to said buffer store; and
deleting data from said cache having a predetermined relationship to said writing operations.

25. A data-storage hierarchy adapted to be connected to a using unit and having a backing store with a first plurality of addressable data storage areas and a buffer store with a second plurality of addressable data storage areas, data transfers means connected to said backing store and said buffer store and adapted to be connected to said using unit for transferring data signals therebetween, a digital processor connected to said backing store, said buffer store and said data transfer means to actuate said data transfer means for operating said data transfer means and said stores, said digital processor including stored program means for storing a plurality of control programs, said programs including in combination:
buffer access program means for enabling said digital processor to actuate said data transfer means for storing and fetching data in and from said buffer store based upon addresses of said addressable data storage areas of said backing store;
first program means for enabling said digital processor to monitor a series of requests for access to said storage hierarchy received from said using unit and for setting a status bit to indicate whether or not given data transfer operations occurred within said series of requests that wrote data received from said using unit into said data storage hierarchy; and
second program means for enabling said digital processor during any of said series of requests for access, which include writing data to said storage hierarchy, to actuate said data transfer means for storing such written data in said backing store, and for effectively removing predetermined data stored in said buffer store, related to said written data, from said buffer store whenever said indications indicate said given operation.

26. The data-storage hierarchy set forth in claim 25, further including in said stored program means, third program means, for enabling said digital processor during a first data transfer operation to actuate said data transfer means or writing said data to said buffer store and said backing store;
in a second operation for writing some data to said backing store only and for setting said status bit when monitoring a one of said first or second operation to indicate said first or second operation as said given operation.

27. The method of operating a data storage hierarchy coupled to user units and having a backing store and a caching buffer store with means to store data in said buffer store based upon addressable storage areas of said backing store, both of said stores having a plurality of addressable data storage areas;
including the steps of:
monitoring chained requests received from said units for access to said storage hierarchy;
setting a status bit based on receiving a specific one of said monitored requests for access in said chained requests which indicates whether or not specific writing operations for the storage of data in the data storage hierarchy are included in said chained requests; and
removing data stored in said buffer store related to said data to be stored when said status bit has been set; and
storing said data in said backing store.

28. The method set forth in claim 27 further including the steps of:
in a first received request monitored during said chained requests, writing first data to said buffer store and to said backing store;
in a second received request monitored during said chained requests, writing second data only to said backing store; and
setting said status bit as a result of monitoring one of said received requests and a chained request indicating said specific writing operation.

29. The method set forth in claim 28 wherein the step of removing data is performed after completion of said chained requests.

30. The method set forth in claim 27, further receiving a sequential bit from one of said user units setting said status bit after the step of receiving a sequential bit from said one user unit and in the step of storing said data storing sequentially processed data received subsequent to receipt of the sequential bit.

31. Performing the method set forth in claim 27 in apparatus wherein said caching buffer store is a volatile random access memory and said backing store includes at least one addressable nonvolatile direct access storage device.

32. The method of operating a data storage hierarchy having an adaptor for being connected to user units for a backing store and a caching buffer store with means to store data in said buffer store based upon addressable storage areas of said backing store, both of said stores having a plurality of addressable data storage areas;
including the steps of:
receiving chained data storage access requests from the adaptor for reading the writing data from and to the storage hierarchy with respect to the user units, respectively;
analyzing said received chained data storage access request for a writing data operation access request within such chained data storage;
removing data from said buffer store in accordance with the address in said backing store of the data to be written received during said analyzed writing data operation;
storing the data received with the write operation request only in said backing store; and
analyzing said chained data storage access requests for a read operation;

moving data to said buffer store from said backing store in accordance with the address in said backing store of the data to be accessed by the read operation request analyzed;

whereby read requests tend to be directed to said buffer store and write requests tend to be directed only to said backing store.

33. The method set forth in claim 32 wherein said write analyzing step further includes the step of inhibiting the moving of data from said backing store to said buffer store for addressable storage areas to those addressable storage areas other than the addressable storage areas receiving data during said write operations.

34. The method set forth in claim 32 or 33, including the steps of:
receiving a request from said adapter for accessing said backing store and for not accessing said buffer store;
in response to said received backing store exclusive access request, deleting data from said buffer store in accordance with the address of the received write operation request; and
inhibiting promotion of data stored in other addressable storage areas of said backing store from said backing store to said buffer store.

35. In the method of operating a data storage hierarchy connected to user units and having a backing store and a caching buffer store with means to store data in said buffer store based upon addressable storage areas of said backing store, both of said stores having a plurality of addressable storage areas;
including the steps of:
receiving chained data storage access requests from the user units for reading and writing data from and to the storage hierarchy, respectively;
receiving data from the user units to be written into said data storage hierarchy at a given addressed area of said backing store, said address being included with said receiving chained data storage write access request;
examining said buffer store to determine whether or not an addressable area thereof has been allocated to said given addressed area of said backing store;
when said examined buffer store area reveals an allocated addressable area, writing said data in said buffer store to said allocated area, otherwise writing said data to said given addressed area;
monitoring chained requests for access to said storage hierarchy received from said units;
setting a status bit based on a monitored specific request for access from said chained requests which indicates whether or not specific writing operations for the storage of data are included in the specific chained request;
removing data stored in said buffer store related to said data when said status bit has been set; and
storing said received data only in said backing store;
receiving requests from said user units for retrieving data stored in said storage hierarchy; and
moving data to said buffer store from said backing store in accordance with said received retrieve requests such that said received retrieve requests for data tend to be responded to by supplying data to said user units from said buffer store.

* * * * *